US010515153B2

United States Patent
Heilman et al.

(10) Patent No.: US 10,515,153 B2
(45) Date of Patent: Dec. 24, 2019

(54) SYSTEMS AND METHODS FOR AUTOMATICALLY ASSESSING CONSTRUCTED RECOMMENDATIONS BASED ON SENTIMENT AND SPECIFICITY MEASURES

(71) Applicant: Educational Testing Service, Princeton, NJ (US)

(72) Inventors: Michael Heilman, Princeton, NJ (US); F. Jay Breyer, Lawrenceville, NJ (US); Michael Flor, Lawrence, NJ (US)

(73) Assignee: Educational Testing Service, Princeton, NJ (US)

( * ) Notice: Subject to any disclaimer, the term of this patent is extended or adjusted under 35 U.S.C. 154(b) by 421 days.

(21) Appl. No.: 14/280,088

(22) Filed: May 16, 2014

(65) Prior Publication Data

US 2014/0343923 A1 Nov. 20, 2014

Related U.S. Application Data

(60) Provisional application No. 61/824,106, filed on May 16, 2013.

(51) Int. Cl.
G06F 17/27 (2006.01)
(52) U.S. Cl.
CPC ................. G06F 17/2785 (2013.01)
(58) Field of Classification Search
CPC .................................................. G06F 17/2785
See application file for complete search history.

(56) References Cited

U.S. PATENT DOCUMENTS

| 9,087,297 | B1* | 7/2015 | Filippova | G06F 16/70 |
| 2005/0182655 | A1* | 8/2005 | Merzlak | G06Q 50/24 |
| | | | | 705/2 |
| 2006/0069589 | A1* | 3/2006 | Nigam | G06F 17/274 |
| | | | | 706/55 |

(Continued)

OTHER PUBLICATIONS

Kuncel, Nathan, Kochevar, Rachael, Ones, Deniz; A Meta-analysis of Letters of Recommendation in College and Graduate Admissions: Reasons for Hope; International Journal of Selection and Assessment, 22(1); pp. 101-107; Mar. 2014.

(Continued)

Primary Examiner — Walter Yehl
(74) Attorney, Agent, or Firm — Jones Day

(57) ABSTRACT

A computer-implemented method of training an assessment model for assessing constructed texts expressing opinions on subjects includes accessing a plurality of training texts, which are constructed texts. The training texts are analyzed with the processing system to derive values of a plurality of linguistic features of an assessment model. At least one of the plurality of linguistic features relates to sentiment and at least one of the plurality of linguistic feature relates to specificity. The assessment model is trained with the processing system based on the values of the plurality of linguistic features. Based on the training, a weight for each of the plurality of linguistic features is determined. The assessment model is calibrated to include the weights for at least some of the plurality of linguistic features such that the assessment model is configured to generate assessment measures for constructed texts expressing opinions on subjects.

33 Claims, 8 Drawing Sheets

(56) References Cited

U.S. PATENT DOCUMENTS

| | | | | |
|---|---|---|---|---|
| 2007/0018953 | A1* | 1/2007 | Kipersztok | G06N 5/003 345/156 |
| 2008/0109454 | A1* | 5/2008 | Willse | G06F 16/313 |
| 2008/0140348 | A1* | 6/2008 | Frank | G06Q 10/06 702/181 |
| 2008/0154883 | A1* | 6/2008 | Chowdhury | G06F 3/0482 |
| 2008/0249764 | A1* | 10/2008 | Huang | G06F 17/2785 704/9 |
| 2009/0119157 | A1* | 5/2009 | Dulepet | G06F 17/2785 705/7.29 |
| 2014/0195518 | A1* | 7/2014 | Kelsey | G06F 16/367 707/722 |
| 2014/0337320 | A1* | 11/2014 | Hernandez | G06F 16/2428 707/722 |

OTHER PUBLICATIONS

Aamodt, Michael, Bryan, Devon, Whitcomb, Alan; Predicting Performance with Letters of Recommendation; Public Personal Management, 22(1); pp. 81-91; 1993.

Artstein, Ron, Poesio, Massimo; Inter-Coder Agreement for Computational Linguistics; Computational Linguistics, 34(4); 2007.

Beigman Klebanov, Beata, Burstein, Jill, Madnani, Nitin, Faulkner, Adam, Tetreault, Joel; Building Subjectivity Lexicon(s) from Scratch for Essay Data; Proceedings of the 13th International Conference on Intelligent Text Processing and Computational Linguistics; New Delhi, India; 2012.

Benamara, Farah, Chardon, Baptiste, Mathieu, Yannick, Popescu, Vladimir; Towards Context-Based Subjectivity Analysis; Proceedings of the 5th International Joint Conference on Natural Language Processing; Chiang Mai, Thailand; pp. 1180-1188; 2011.

Bird, Steven, Klein, Ewan, Loper, Edward; Natural Language Processing with Python; O'Reilly Media; 2009.

Blitzer, John, Dredze, Mark, Pereira, Fernando; Biographies, Bollywood, Boom-boxes and Blenders: Domain Adaptation for Sentiment Classification; Proceedings of the 45th Annual Meeting of the Association of Computational Linguistics; Prague, Czech Republic; pp. 440-447; 2007.

Carvalho, Vitor, Kiran, Yigit, Borthwick, Andrew; The Intelius Nickname Collection: Quantitative Analyses from Billions of Public Records; Proceedings of the 2012 Conference of the North American Chapter of the Association for Computational Linguistics: Human Language Technologies; Montreal, Canada; pp. 607-610; 2012.

Cohen, Jacob; Weighted Kappa: Nominal Scale Agreement with Provision for Scaled Disagreement or Partial Credit; Psychological Bulletin, 70(4); pp. 213-220; 1968.

Danescu-Niculescu-Mizil, Cristian, Kossinets, Gueorgi, Kleinberg, Jon, Lee, Lillian; How Opinions are Received by Online Communities: A Case Study on Amazon.com Helpfulness Votes; Proceedings of the 18th International Conference on World Wide Web; New York, NY; pp. 141-150; 2009.

Daume, Hal; Frustratingly Easy Domain Adaptation; Proceedings of the 45th Annual Meeting of the Association of Computational Linguistics; Prague, Czech Republic; pp. 256-263; 2007.

Dzikovska, Myroslava, Nielsen, Rodney, Brew, Chris, Leacock, Claudia, Giampiccolo, Danilo, Bentivogli, Luisa, Clark, Peter, Dagan, Ido, Dang, Hoa Trang; SemEval-2013 Task 7: The Joint Student Response Analysis and 8th Recognizing Textual Entailment Challenge; SEM 2013: The First Joint Conference on Lexical and Computational Semantics; Atlanta, GA; 2013.

Farkas, Richard, Vincze, Veronika, Mora, Gyorgy, Csirik, Janos, Szarvas, Gyorgy; The CoNLL-2010 Shared Task: Learning to Detect Hedges and their Scope in Natural Language Text; Proceedings of the 14th Conference on Computational Natural Language Learning: Shared Tasks; Uppsala, Sweden; pp. 1-12; 2010.

Lafferty, John, McCallum, Andrew, Pereira, Fernando; Conditional Random Fields: Probabilistic Models for Segmenting and Labeling Sequence Data; Proceedings of the 18th International Conference on Machine Learning; San Francisco, CA; pp. 282-289; 2001.

Pang, Bo, Lee, Lillian; A Sentimental Education: Sentiment Analysis Using Subjectivity Summarization Based on Minimum Cuts; Proceedings of the Association for Computational Linguistics; 2004.

Parker, Robert, Graff, David, Kong, Junbo, Chen, Ke, Maeda, Kazuaki; English Gigaword, 4th Edition; Linguistic Data Consortium; Philadelphia, PA; 2009.

Shermis, Mark, Burstein, Jill; Handbook of Automated Essay Evaluation: Current Applications and New Directions; Routledge Academic; 2013.

Shermis, Mark, Hamner, Ben; Contrasting State-of-the Art Automated Scoring of Essays: Analysis; Proceedings at the Annual Meeting of the National Council on Measurement in Education; Vancouver, CA; 2012.

Titov, Ivan, McDonald, Ryan; A Joint Model of Text and Aspect Ratings for Sentiment Summarization; Proceedings of the Association for Computational Linguistics: HLT; Columbus, OH; pp. 308-316; 2008.

Baxter, James, Brock, Barbara, Hill, Peter, Rozelle, Richard; Letters of Recommendation: A Question of Value; Journal of Applied Psychology, 66; pp. 296-301; 1981.

Dunbar, Stephen, Koretz, Daniel, Hoover, H.; Quality Control in the Development and Use of Performance Assessments; Applied Measurement in Education, 4(4); pp. 289-303; 1991.

Efron, Bradley, Tibshirani, Robert; An Introduction to the Bootstrap; Chapman and Hall; 1993.

Ghose, Anindya, Ipeirotis, Panagiotis; Estimating the Helpfulness and Economic Impact of Product Reviews: Mining Text and Reviewer Characteristics; IEEE Transactions on Knowledge and Data Engineering, 23(10); pp. 1498-1512; 2011.

Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, Vanderplas, Jake, Passos, Alexandre, Cournapeau, David, Brucher, Matthieu, Perrot, Matthieu, Duchesnay, Edouard; Scikit-learn: Machine Learning in Python; Journal of Machine Learning Research, 12; pp. 2825-2830; 2011.

* cited by examiner

SYSTEMS AND METHODS FOR AUTOMATICALLY ASSESSING CONSTRUCTED RECOMMENDATIONS BASED ON SENTIMENT AND SPECIFICITY MEASURES

CROSS-REFERENCE TO RELATED APPLICATIONS

The present application claims priority from U.S. Provisional Application Ser. No. 61/824,106 entitled "Predicting Specificity, Sentiment, and Ratings in Graduate School Recommendations," filed May 16, 2013, the entirety of which is hereby incorporated by reference.

FIELD

This disclosure is related generally to automated assessment of constructed text and more particularly to automated assessment of constructed recommendations or assessments of subjects.

BACKGROUND

Recommendations, such as those written on behalf of applicants seeking employment or school admission, are an important part of the hiring or admission process. These types of recommendations are typically reviewed manually by humans, which is a burdensome process that lacks objectivity and consistency. What is worse, the burden often causes recommendations to be ignored all together. This is unfortunate, as constructed recommendations provide valuable insight into an applicant's non-cognitive traits that may be predictive of success (e.g., being admitted, graduating, or excelling at work), but are not measured by traditional standardized tests (e.g., GRE or SAT). Thus, the present inventors have observed a need to automate the assessment of constructed recommendations and other constructed texts that provide opinions on particular subjects (e.g., student, job candidate, company, product, service, etc.).

SUMMARY

Systems and methods are described for training an assessment model for assessing constructed texts expressing opinions on subjects. A computer-implemented method of training the assessment model includes accessing a plurality of training texts, which are constructed texts. The training texts are analyzed with the processing system to derive values of a plurality of linguistic features of an assessment model. At least one of the plurality of linguistic features relates to sentiment and at least one of the plurality of linguistic feature relates to specificity. The assessment model is trained with the processing system based on the values of the plurality of linguistic features. Based on the training, a weight for each of the plurality of linguistic features is determined. The assessment model is calibrated to include the weights for at least some of the plurality of linguistic features such that the assessment model is configured to generate assessment measures for constructed texts expressing opinions on subjects.

DETAILED DESCRIPTION

The subject (e.g., a school applicant or job applicant) of a recommendation is often personally well-known to the recommender, and the stakes are often quite high (e.g., the recommendation may be for a college or job application). Consequently, recommenders typically are more reluctant to use negative language about the subject. Instead, the recommenders often either decline to provide a recommendation (in which case there would be no recommendation letter) or use lukewarm, vague, and generic language that avoids commitment (e.g., "However, she could show a little more initiative."). Thus, the linguistic cues that separate a good recommendation from a poor one may be quite subtle.

The present inventors have observed several characteristics of constructed recommendations/assessments that may set good ones apart from the rest. While the primary purpose of a recommendation is typically to evaluate a subject, not every portion of the recommendation may contain evaluative content. For example, a recommender may start off by describing his own background, his institution, or comment on the recommendation format. This type of non-evaluative content typically would not contribute to a human reviewer's perception of the strength of the recommendation or recommendee. Thus, when assessing a recommendation it may be useful to ignore the non-evaluative portions.

When assessing an evaluative portion of the recommendation, the present inventors have observed that the sentiment and specificity expressed therein may be characteristics that distinguish a recommendation. Sentiment relates to the recommender's view, assessment, or opinion, which could roughly be classified as positive, negative, or neutral, for example. In the context of an evaluation, positive sentiment is desirable. Moreover, good recommendations tend to be very specific, providing detailed examples about the recommendee to highlight desirable traits. Poor recommendations, on the other hand, often contain mostly generic or stereotypical texts, lacking details or examples about the recommendee to indicate that he/she/it is well known to the recommender. Thus, the level of specificity present in an evaluation is another characteristic that may correlate with the strength of the overall recommendation.

Figure 1:
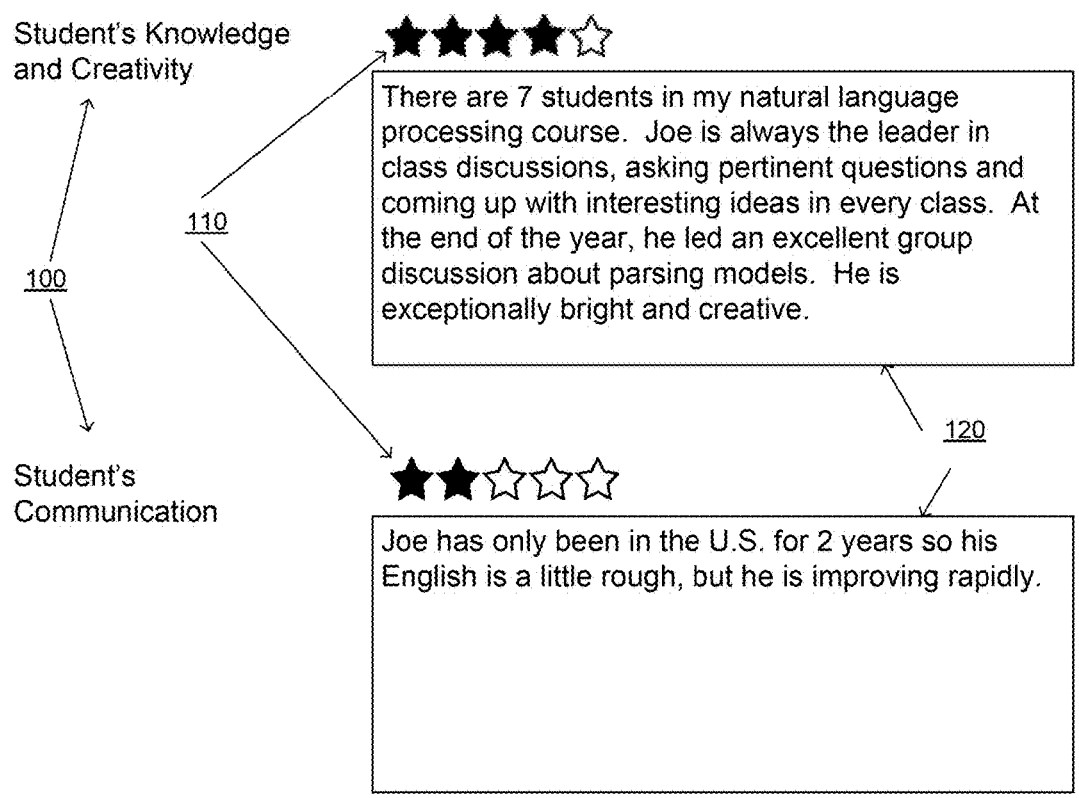
FIG. 1 depicts exemplary structured recommendations.

FIG. 1 shows an example of structured recommendations (in this case for graduate-school applicants). In this particular example, the form used for soliciting the recommendations is structured, which means that the recommenders were asked to evaluate applicants on specific dimensions 100, such as knowledge and creativity, communication, teamwork, resilience, planning and organization, ethics and integrity, etc. For each dimension 100, the recommender may provide a quantitative rating 110, such as on a scale of 1 to 5 (e.g., which may correspond to "below average," "average," "above average," "outstanding," and "truly exceptional") or other numerical scales. In addition, the recommender is asked to construct text statements 120 to expound on his opinion of the various dimensions 100 of the applicant. It is worth noting here that while some structured recommendations may include ratings, the ratings provided by the recommenders, at face value, may not be a reliable predictor of an applicant's capabilities since different recommenders may interpret rating scales differently and the ratings may not be consistent with the corresponding text. Thus, when gauging applicants, it may be desirable to use ratings generated by a rating model trained based on a large training set of recommender-provided ratings and associated texts, as will be described in further detail below. It is also worth nothing that while this example shows a structured recommendation, the present disclosure described herein is not limited to structured recommendations/assessments, as it may equally apply to unstructured recommendations (e.g., recommendation letters or assessments written without any particular format or structural constraints, such as one or more free-form paragraphs prepared about a subject).

Figure 2:
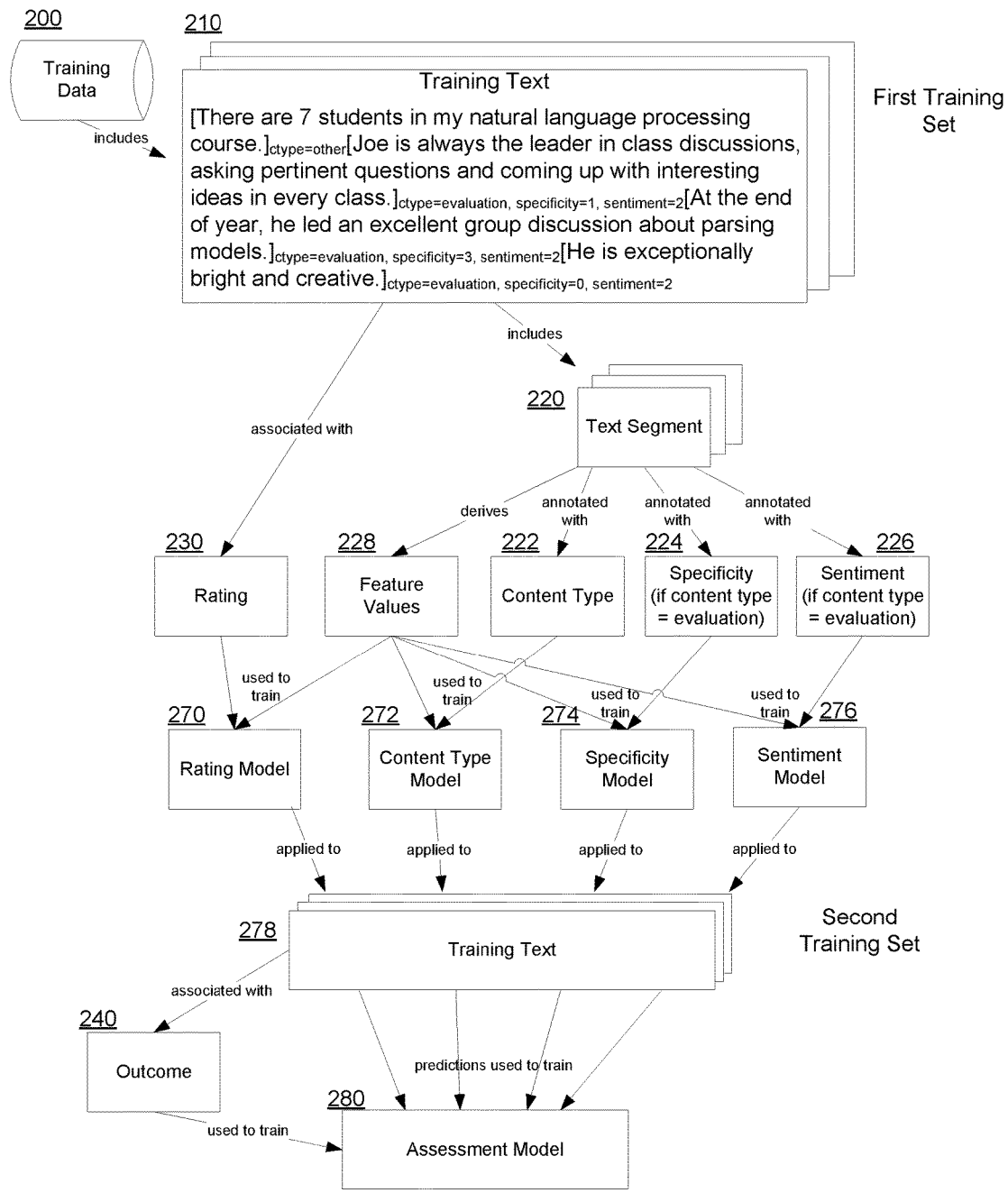
FIG. 2 is a block diagram depicting exemplary generation of models for assessing constructed texts.

FIG. 2 is a block diagram depicting an exemplary framework for training models to assess constructed recommendations or assessments about subjects (e.g., a person such as a student, job candidate, or service provider; entity such as a company or organization; product; service; etc.). The system can be implemented using any suitable combination of hardware, software, and/or firmware using algorithms implemented in any suitable programming language such that a processing system of a computer system is configured to carry out the exemplary approaches described herein. One or more models are trained using training data 200, which for example includes a collection of constructed training texts 210 (i.e., texts written or generated by individuals or texts converted from spoke words of individuals using any conventional speech-to-text conversion technology known to those of ordinary skill in the art). These training texts 210 may be texts of a first set of training texts, as shown in the example of FIG. 2. Each of the training texts includes multiple text segments 220, such as individual characters, n-grams, sentences, paragraphs, or the entire training text 210 itself (in the example depicted in FIG. 2, text segments 220 are defined at the sentence level). By analyzing the texts in the training texts 210 and text segments 220, values of various linguistic features 228 may be derived. As will be described in more detail below, linguistic features determined (e.g., via preliminary evaluations of a development data set) to be good predictors of a particular task (e.g., predicting sentiment) may be used as independent variables (i.e., predictors) of a model for predicting that task.

One example of a linguistic feature is text length. In one exemplary embodiment the length feature is a binary feature that indicates whether the number of tokens in the text segment (e.g., sentence or entire training text) exceeds x, where $x \in \{2, 4, 8, 16, 32, 64\}$. More generally, the length feature may be any numerical measure of length (e.g., sentence length, paragraph length, etc.). Another example is a part-of-speech feature, which in one example may indicate the presence of the types of part-of-speech (e.g., adjectives) in a text segment. As another example, a word n-gram feature may indicate the presence of certain determined n-grams in a text segment. In yet another example, a hedging feature may detect (e.g., via n-gram detection, part-of-speech, etc.) language used to express uncertainty on behalf of the recommender (e.g., "sometimes," "a bit," "however," etc.).

In another example, a sentiment feature may indicate the presence of at least one positive, negative, or neutral word in the text segment, or it may indicate sentiment of a text segment using any suitable numerical measure. In one embodiment, a sentiment lexicon described in Beigman Klebanov et al., "Using pivot-based paraphrasing and sentiment profiles to improve a subjectivity lexicon for essay data," *Transactions of Association for Computational Linguistics* (2013), may be used to compute the values of the sentiment features. For example, each word in the lexicon may have positive values between 0 and 1 (estimated through crowd sourcing) for positivity, negativity, and neutrality, and these three values may sum to 1. For purposes of training the models described herein, positive words may be defined to be those with a positivity value greater than 0.9; negative words may be those with negativity value greater than 0.9; and other words in the lexicon may be considered neutral. Words that are not in the lexicon may be considered to be neither positive, negative, nor neutral.

In another example, a specificity feature may indicate the level of specificity expressed in the text segment. Values of the specificity features may be determined, for example, based on a specificity lexicon including words or phrases that correlate with specificity (e.g., "for example," "for instance," "I remember," etc.), identification of particular part-of-speech often used when giving a specific example (e.g., past tense), etc.

For models that are trained on multiple text segments (e.g., where each text segment is a sentence in a training text), another exemplary feature that may be used in a model and model training is a surrounding text segment feature. For example, for each text segment, this feature may apply a part-of-speech feature, word n-gram feature, sentiment feature, and/or other features to the text segment's adjacent text segments in the surrounding (nearby) area (either the preceding text segment, following text segment, or both). For example, if a text segment is determined to express positive sentiment (by virtue of the sentiment feature), the surrounding text segment feature would also cause the text segment to be labeled with information indicating that the preceding adjacent text segment also expresses positive sentiment but the following adjacent text segment expresses negative sentiment.

Another exemplary feature that may be used in a model and model training is the frequency feature, which measures how frequently the words in a text segment appear in a larger corpus sample of English text, such as the New York Times stories from 2008. In one embodiment, the words in the New York Times stories may be counted and those that occur more than 100 times are included in a final NYT vocabulary. The frequency feature may be defined by one or more of the following equations:

$$\frac{1}{N} \sum_{i=1}^{N} c(w_i), \quad (1)$$

$$\frac{1}{N} \sum_{i=1}^{N} \log(c(w_i) + 1), \quad (2)$$

$$\frac{1}{N} \sum_{i=1}^{N} oov(w_i), \quad (3)$$

where N is the number of words in the input text segment; $c(w_i)$ is the number of times that word token i in the input text segment appears in the NYT vocabulary ($c(w_i)=0$ for words not in the NYT vocabulary); log is the natural logarithm function; and $oov(w_i)$ is 1 if the word is not in the NYT vocabulary and 0 otherwise.

Values of any combination of the above mentioned features, as well as additional features, may be used in models and model training and may be derived from analyzing the text of the training texts 210 or text segments 220. In one embodiment, it may be desired to train a model for classifying text segments as ones that are relevant to a recommendation or assessment of a subject (e.g., text segments that are useful for evaluating a recommendee) and ones that are not. For example, some text segments may relate to background information about the recommender and may not be relevant to the subject itself. In other words, the task is to determine the content type of a text segment, such as whether it is relevant to an evaluation of the recommendee. Each text segment 220 in the training texts 210 may be annotated (e.g., by a human reviewer or by an automated process) to reflect how each text segment 220 should be classified. This type of annotation may be referred to as "content type" 222, which is denoted in FIG. 2 as "ctype" in the subscript following each sentence. The content type may be labeled as "evaluation," which indicates that the annotated text segment 220 expresses an evaluation of the recommendee (e.g., in FIG. 2, label 210, the sentence that begins with, "Joe is always the leader . . . ," is labeled with "ctype=evaluation"). If the content of a text segment 220 relates to something else (e.g., background information of the recommender, comments about the recommendation form, etc.), then its content type may be labeled as "other" (e.g., in FIG. 2, label 210, the sentence that begins with, "There are 7 students . . . ," is labeled with "ctype=other"). The annotated content type 222 of each text segment 220 in the training texts 210 (i.e., the dependent variable), along with values of predictive linguistic features 228 of the corresponding text segments 220 (i.e., the independent variables), may be used to train a content type model 272 for determining the content types of text segments. Suitable linguistic features for predicting content type may include word n-grams of the recommendee's name and third-person pronouns (the presence of which may correlate with an evaluative content type), as well as first-person pronouns (the presence of which may indicate that the recommendee is talking about himself and therefore may correlate with a non-evaluative content type), for example.

In another example, it may be desirable to train a model for identifying the amount of specific information about a subject (e.g., a recommendee) present in a text segment. For text segments 220 that evaluate the recommendee (e.g., those that are marked with "ctype=evaluation"), the text segments (or parts thereof) may be annotated (e.g., by a human) to indicate the amount of specific information provided. This type of annotation may be referred to as "specificity" 224. In an example, the specificity of a sentence may be labeled as "0" to denote generic content (e.g., in FIG. 2, label 210, the sentence, "He is exceptionally bright and creative."); a specificity of "1" may denote specific content without examples (e.g., in FIG. 2, label 210, the sentence that begins with, "Joe is always the leader . . . ."); and a specificity of "2" may denote specific content with examples (e.g., in FIG. 2, label 210, the sentence, "At the end of the year he led an excellent group discussion about parsing models."). Note that the specificity annotations of text segments 220 may be aggregated (e.g., by summing, averaging, etc.) to estimate the specificity of a larger segment, such as the entire recommendation/training text. The annotated specificity 224 of each text segment 220 in the training texts 210 (i.e., the dependent variables), along with values of linguistic features 228 of the corresponding text segments 220 (i.e., the independent variables), may be used to train a specificity model 274 for determining a measure of specificity of text segments. Suitable linguistic features for assessing specificity may include parts-of-speech features indicating past tense (which may be predictive because detailed examples are typically expressed in the past tense) and text segment lengths, for example. Automated methods may be used (e.g., in place of or in addition to human annotation scoring) to determine a specificity value of given constructed text so as to provide a computer-determined value for the variable corresponding to the specificity feature, e.g., for use in generating predictive results after the specificity model has been trained. For instance, the computer processing system can be configured to parse the constructed text and check for the presence of predetermined specificity words and word relationships between proximate types of words. For instance the computer processing system can check for the presence and count of proper nouns and pronouns against a suitable lexicon, and can also check for the type of verb contained in the sentence containing the proper name or pronoun. Thus, consistent with the examples above, the computer system could score a sentence containing a pronoun and a "to be" verb as generic content with a score of 0, could score a sentence containing a proper name and a "to be" verb as specific content with a score of 1, and could score a sentence containing a proper name and an active verb (not a "to be" verb) as specific content with example with a score of 2. The values of all sentences in the constructed text could be summed to provide an overall specificity score for the constructed text. The specificity value could also be normalized if desired, by dividing by the number of words in the constructed text or by using some other normalization.

In another example, it may be desired to train a model for identifying whether a text segment evaluating a subject (e.g. a recommendee) expresses positive, negative, or neutral sentiment. Text segments 220 may be annotated to indicate the type of sentiment expressed (e.g., positive, negative, or neutral sentiment). This type of annotation will be referred to as "sentiment" 226. In one embodiment, the sentiment of a sentence may be labeled as "0" to denote negative or very negative sentiment; "1" to denote neutral sentiment, and "2" to denote positive or very positive sentiment (e.g., in FIG. 2, label 210, the sentence, "He is exceptionally bright and creative."). Similar to the specificity annotations, the sentiment annotations of text segments may be aggregated to estimate the sentiment of a larger segment, such as the entire recommendation. The sentiment 226 of each text segment 220 in the training texts 210 (i.e., the dependent variable), along with values of predictive linguistic features 228 of the corresponding text segments 220 (i.e., the independent variables), may be used to train a sentiment model 276 for determining the sentiment expressed in text segments. Suitable linguistic features for predicting sentiment may also include sentiment features and hedging features (e.g., words and phrases that express reservation, such as "sometimes," may correlate to negative sentiment). Automated methods may be used (e.g., in place of or in addition to human annotation scoring) to determine a sentiment value of given constructed text so as to provide a computer-determined value for the variable corresponding to the sentiment feature, e.g., for use in generating predictive results after the sentiment model has been trained. For instance, the computer processing system can be configured to parse the constructed text and check for the presence of predetermined sentiment words (e.g., excellent, fantastic, great, fabulous, mediocre, acceptable, average, decent, unacceptable, underperformed, disappointing, poor, etc., or variations on these and the like)

and/or hedge words (e.g., however, but, unfortunately, etc.) with reference to a sentiment lexicon and generate any suitable numerical value based on that data, e.g., by summing values assigned to each such sentiment word. The sentiment value could also be normalized if desired, by dividing by the number of words in the constructed text or by using some other normalization.

In another example, it may be desired to train a model to determine whether a text segment plays a significant role in distinguishing the strength or quality of the constructed text (e.g., recommendation letter) to which the text segment belongs. In other words, the task of the model is to identify key text segments that separate constructed texts according to their respective good, mediocre, or bad recommendation/assessment performance. While not depicted in FIG. 2, a text segment evaluating a recommendee (e.g., those that are marked with "ctype=evaluation") may be annotated (e.g., by a human) to indicate whether its content is such a differentiating text segment. This type of annotation may be referred to as "differentiating value," and may take on the value of "1" to indicate a positively significant text segment, "0" to indicate an insignificant text segment, or "−1" to indicate a negatively significant text segment. The annotated differentiating value of each text segment 220 in the training texts 210 (i.e., the dependent variable), along with values of predictive linguistic features 228 of the corresponding text segments 220 (i.e., the independent variables), may be used to train a differentiating value model for identifying key text segments that are difference-makers. Suitable linguistic features for predicting differentiating value may include sentiment features and surrounding sentence features of highly positive words and phrases.

In another example, it may be desired to train a model to predict recommenders' ratings based on the texts they constructed. As discussed above with respect to FIG. 1, a training text 210 may be associated with a rating 230 that quantifies a recommender's or assessor's opinion of a subject's proficiency in a particular dimension (e.g., knowledge and creativity). The rating 230 may be provided directly by the recommender, derived from information provided by the recommender (e.g., the rating may be an average of several ratings provided by the recommender), or it may be provided by a source different from the recommender (e.g., provided by a different human rater or automatically by a machine). The rating 230 of each training text 210 (i.e., the dependent variable), along with values of predictive linguistic features 228 of the corresponding training text 210 (i.e., the independent variables), may be used to train a rating model 270 for predicting the rating of a constructed text (e.g., constructed recommendation). Suitable linguistic features for predicting ratings may include word n-gram features, which count the occurrence of each n-gram. For example, words that express unqualified praise (e.g., "exceptional," "extremely," "truly") may correlate positively with ratings, whereas mild qualifications (e.g., "average," "above average," "good") and hedge words (e.g., "sometimes") may negatively correlate with ratings or have weak (e.g., near zero) correlations with ratings.

In yet another example, it may be desired to train a model to predict a particular outcome based on a given constructed text (e.g. recommendation). For example, if the constructed text is a recommendation for graduate school applicant, the outcome may be whether the applicant was ultimately admitted, whether he ultimately graduated, the number of years it took for him to graduate, his GPA, the score that a human reviewer gave to the recommendation, etc. If the constructed text is for a job applicant, the outcome may be whether the applicant ultimately got the job, whether he was successful, etc. If the constructed text is a recommendation or assessment of a product/service, the outcome may be whether readers of the constructed text ultimately purchased/retained the recommended product/service. It is worth emphasizing that these mentioned outcomes are non-limiting examples only, and that the model may be trained to predict any outcome that may be correlated to the content of a constructed text.

As shown in FIG. 2, training an assessment model 280 for predictive purposes may involve using a second set of training texts 278 (which may be referred herein as the second training texts), outcome data 240 associated with each of the second training texts 278, and one or more "first-level models" (e.g., the rating model 270, content type model. 272, specificity model 274, sentiment model 276, differentiating value model) and/or any other models for assessing contents of a constructed text, which can be applied to the second training texts 278 to generate predictions used to train the assessment model 280. In this regard, it will be appreciated that the first-level models may be trained using the first set of training texts 210 (which may be referred to herein as first training texts) and that the assessment model 280 may be trained using an additional, different second set of training texts 278. The outcome data 240 may be relevant to the outcome that the assessment model 280 is designed to predict. For example, if the assessment model 280 is designed to predict whether a college applicant will be accepted based on his letter of recommendation, the outcome data 240 associated with a second training text 278 (e.g., a college recommendation letter) can be whether the subject of the second training text 278 (e.g., a college applicant) was accepted to college. In other words, the outcome data 240 can be used as the dependent variable of the assessment model 280.

The independent variables (i.e., the predictors) of the assessment model 280 may be any combination of predictive data resulting from applying the aforementioned first-level models to the second training texts 278. For instance, the assessment model 280 could be a linear combination of a sentiment feature, a specificity feature, a content type feature, a rating feature, and one or more other features, wherein these features correspond to independent variables of the assessment model 280. Values of the sentiment feature and specificity feature for any given constructed text can be determined by a computer processing system by appropriate parsing of the text and analysis for sentiment and specificity content such as noted in examples described above. The weights for these various features can be determined using a training process (e.g., multiple regression) involving training texts. For example, if the specificity model 274 is applied to the second training text 278, the predictive data for that second training text 278 would be a predicted specificity value. Similarly, if the sentiment model 276 is applied to the second training text 278, the predictive data would be a predicted sentiment value. The predictive data (i.e., the independent variables), along with the outcome data 240 (i.e., the dependent variable) associated with each second training text 278, are used to train the assessment model 280 to determine weights for the features (independent variables) so as to provide a calibrated assessment model 20 for predicting an outcome or providing a score or assessment value for a constructed text to be analyzed. For instance, it may be desired to predict an outcome of a similar nature as that of the outcome data 240 used in the training (e.g., if the outcome data 240 used in the training is whether a job applicant was hired, the assessment model 280 would predict whether a job applicant would get hired based on a recommendation). In addition, the independent variables of the assessment model 280 may include external measures of proficiency ("external" because the measures are not derived from the training texts), such as SAT, GRE, GPA scores, etc. of the recommendee.

In another example, an assessment model 280 may be trained without using the first-level models as described in the previous example. In this example, training texts from a first set of training texts 210 or a second set of training texts 278 may each be associated with a rating (similar to 230) and may each include text segments (similar to 220) that are analyzed according to content type (similar to 222), specificity (similar to 224), sentiment (similar to 226), and/or differentiating value to determine values for such features such as noted in examples above. For instance, assigned values for features or values of features from human annotations may be used, and/or computer determined values for various linguistic features, including sentiment and specificity, may be used. These values may be used as values for the assessment model's 280 independent variables associated with the corresponding features. The dependent variable may be the outcome data 240 associated with the training data, as described above. The assessment model 280 may therefore be trained based on feature values determined from analysis of training texts (i.e., the independent variables) and the associated outcome data 240 or assigned score for a given training text (i.e., the dependent variable) to determine weights for the various features corresponding to independent variables of the model. Similar to the previous example, the assessment model 280 may also include external measures of proficiency, such as SAT, GRE, GPA scores, as independent variables.

The aforementioned exemplary models may be linear models (i.e., linear combinations of weighted variables) or other statistical models and may be trained using statistical approaches known to one of ordinary skill in the art, such as multiple regression. Examples of linear models will be described below for exemplary sentiment and specificity models. In one example, $l_2$-regularized logistic regression may be used for models that predict categorical results, including binary results, such as the content type model 272 in some examples. For models that predict ordinal results, such as the specificity model 274, sentiment model 276, rating model 270, differentiating value model, and assessment model 280 in some examples, ridge regression (i.e., $l_2$-regularized least square regression) may be used. For ridge regression, after training an initial model, the model's outputs/predictions could be rescaled to better match the distribution of the observed dependent variable. For example, the following linear transformation may be applied on the predictions so that they better match a target linear distribution (which may be referred to as the gold standard distribution).

$$\hat{y}_{new} = \frac{\hat{y} - M(\hat{y}_{train})}{SD(\hat{y}_{train})} \cdot SD(y_{train}) + M(y_{train}) \quad (4)$$

where $y_{train}$ is the vector of the training set gold standard labels, $\hat{y}_{train}$ is the vector of predictions for the training set from the initial model, $\hat{y}$ is the raw estimate from the model prior to rescaling, M returns the mean of a vector, and SD returns the standard deviation, and $\hat{y}_{new}$ is the rescaled estimate from the model. If the gold standard distribution is not linear, a non-linear transformation may be applied. Note that this transformation is performed on the training set.

Figure 3:
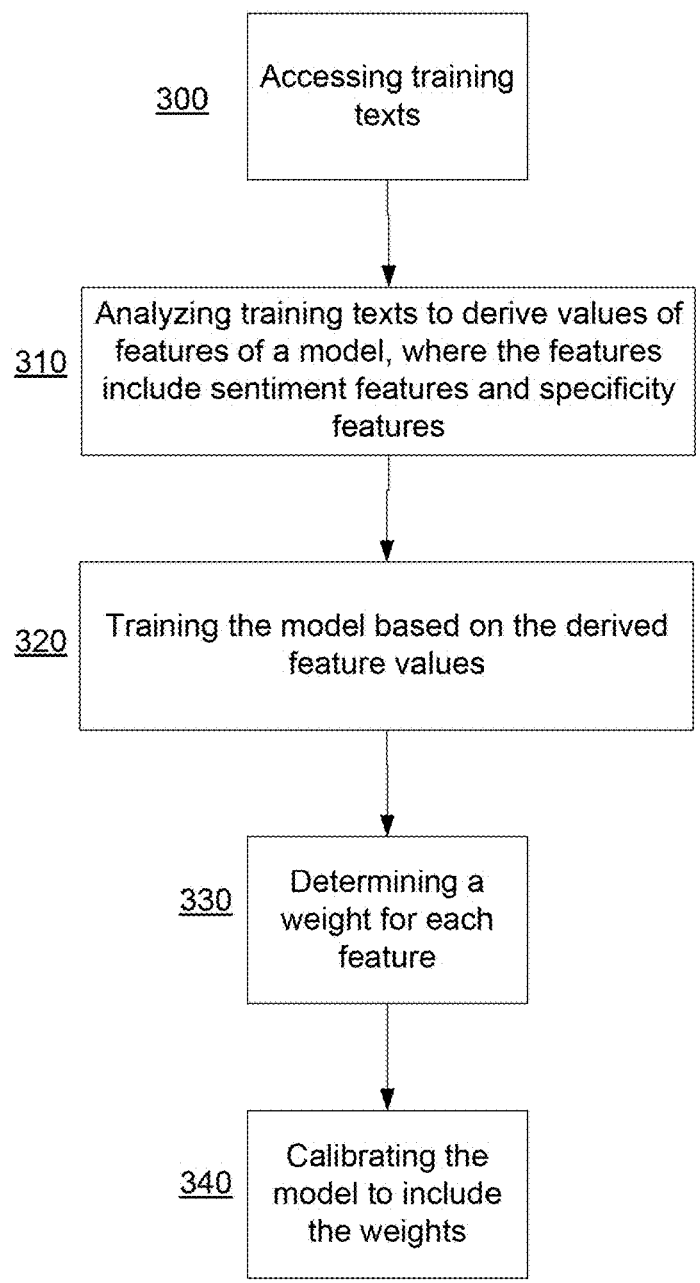
FIG. 3 is a flow diagram depicting an exemplary computer-implemented method of generating an assessment model.

FIG. 3 is a flow diagram for an exemplary process for training an assessment model using a processing system. At 300, the training texts, which may be stored on disk or in memory such as RAM, are accessed. At 310, the training texts are analyzed to derive values of linguistic features used as independent variables in the model being trained. For example, values of the length feature may include whether a text segment is longer than x words, and values of the word n-gram feature may include the number of times the recommendee's name appears in the text segment, etc. The linguistic features may, for example, include sentiment features, such as occurrences of positive, neutral, or negative words in the training texts, for example. The linguistic features may also, for example, include specificity features, such as whether a text segment is written in past tense, for example.

The model may be constructed to use a variety of frameworks. In general, the model may be represented by a mathematical relationship between a set of independent variables and a set of dependent variables. For example, the mathematical framework could employ a linear model, such as:

$$\text{Outcome}=w_0+w_1 \cdot F_1+w_2 \cdot F_2+w_3 \cdot F_3 \ldots, \quad (5)$$

where "Outcome" is a dependent variable whose value may represent the outcome predicted according to the model, the variables $F_i$ are independent variables that represent values of the linguistic features determined from analyzing the text segments, and the coefficients $w_i$ represent weighting coefficients for the associated variables $F_i$. More generally, the model is not limited to a linear model such as illustrated above but can be a suitable function F of the weighting coefficients and the variable, i.e.: Sentiment=F ($w_i$, $F_i$). For example, the function F in the model could combine powers of various variables, products of certain variables, etc., and the choice of the particular mathematical form of the model in this regard is within the purview of one of ordinary skill in the art. In exemplary work conducted by the present inventors, a linear model was used. The description of the mathematical framework used to represent this model applies equally to other models described hereinafter.

In one example, at 320 the model may be trained with training texts by using each training text's outcome data (e.g., whether a job applicant got hired) as the dependent variable, "Outcome," and using the derived values of the relevant features as values for the variables $F_i$. An objective of training the model is to determine values for those weights $w_i$ that would result in an optimal correlation between the independent variables and dependent variables in view of the training texts. At 330, the weights $w_i$ are determined (e.g., by using regression analysis). At 340, the determined $w_i$ weights are used to calibrate the model. That is, the mathematical model is updated to include the numerical weights determined from training.

Figure 4A:
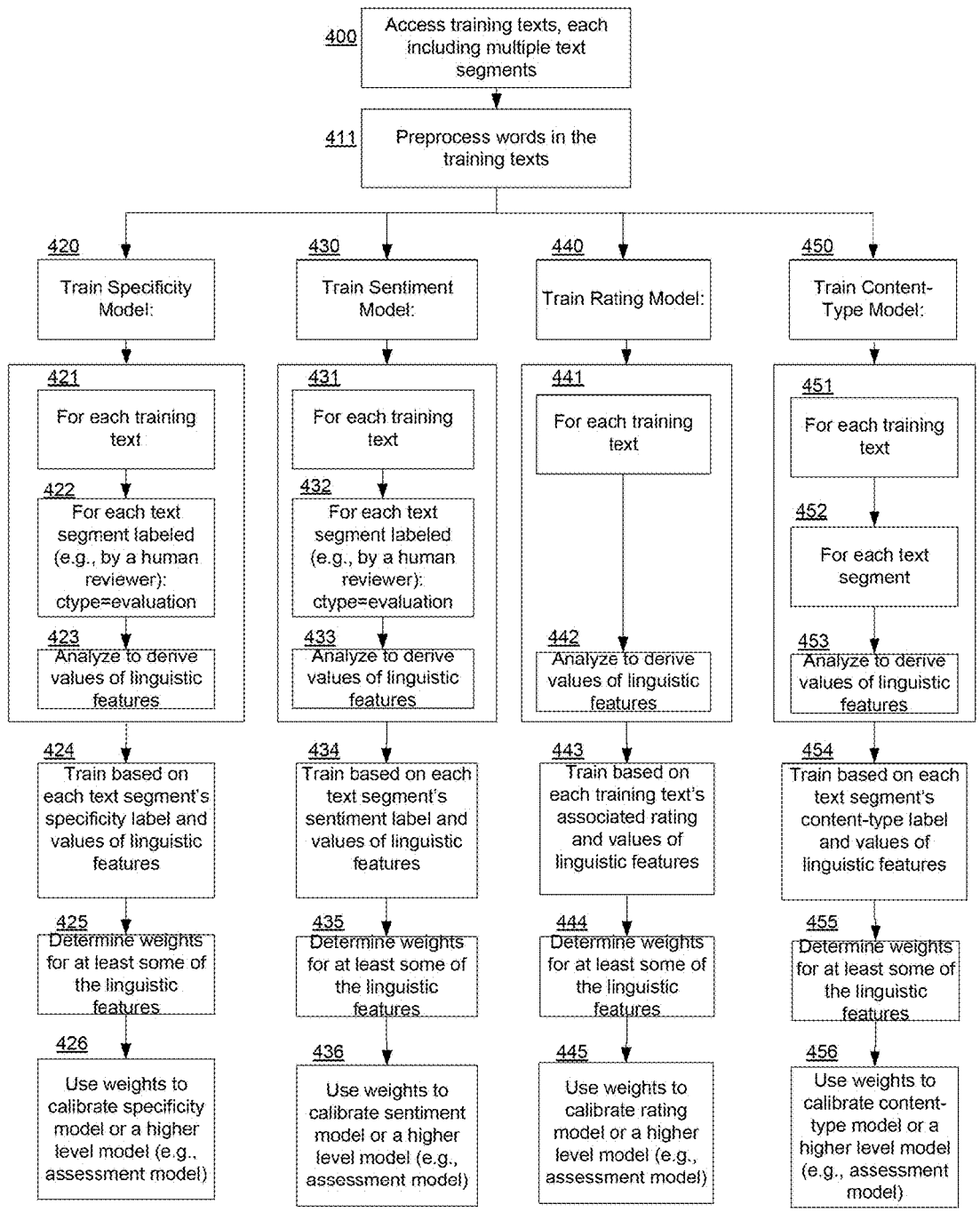
FIGS. 4A-4B are flow diagrams depicting an exemplary computer-implemented method of generating an assessment model.
Figure 4B:
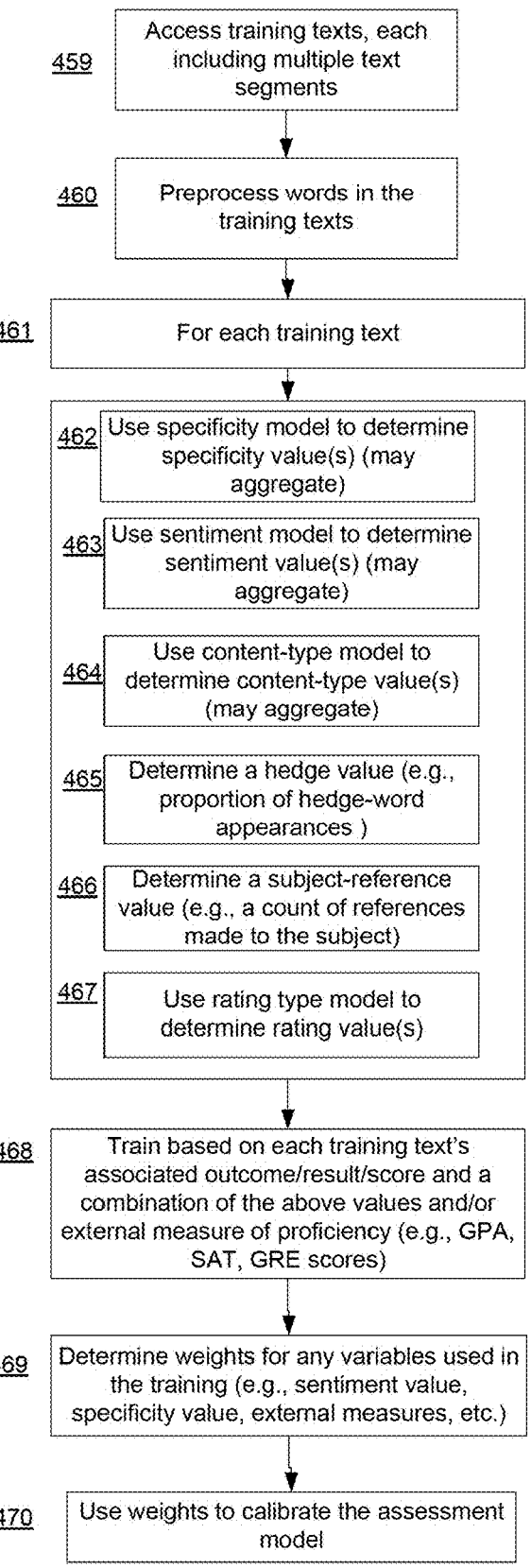

FIGS. 4A-4B illustrate a flow diagram for an exemplary process for training various models for assessing constructed texts (e.g., recommendations). At 400, training texts that each includes one or more text segments are accessed from memory storage (e.g., disk or RAM). At 411, the training texts are preprocessed to avoid learning spurious associations. For example, a model should not predict that a recommendation is negative simply because there were several people with the same first name that received negative recommendations in the training set. Thus, a number of preprocessing steps are preformed to generalize the training texts to reduce personal information, as well as simplify punctuation and numbers. In an example, the preprocessing steps may include:

If the token matches the applicant's first name, it is replaced by "*FIRST_NAME*";

Otherwise, if the token is a nickname of the applicant's first name, it is replaced by "*NICK_NAME*";

Otherwise, if the token matches the applicant's last name, it is replaced by "*LAST_NAME*";

Otherwise, if the token is "he," "she," "him," "her," "his," "her," "hers," "himself," "herself" it is replaced by "*HE_SHE*";

Otherwise, if the lowercased token is "miss," "mr.," "mrs.," "ms." (or a version of those without the period), it is replaced by "*MR_ETC*";

Otherwise, if the token contains a numeric digit, it is replaced by "*NUMBER*";

Otherwise, if the token contains no letters or numbers, it is replaced by "*PUNCT*";

Otherwise, if the token is not a stop word and has a capital letter, it is replaced by "*CAP*" (even when at the beginning of a sentence).

After the training texts have been preprocessed, at 420-426 the specificity model for determined a text segment's specificity is trained. Labels 421 to 423 represent an example where an iterative process analyzes the training texts to derive values for linguistic features used in the specificity model. The iterative process may begin by analyzing each training text 421. For each text segment therein, it is analyzed to determine whether its content type is labeled as "evaluation," which indicates that the text segment's content relates to an evaluation of the recommendee 422. Each evaluative text segment is then analyzed to derive values for the predictive linguistic features used in the specificity model 423. For example, if the specificity model includes a past-tense feature as one of its independent variables, a text segment would be analyzed to determine whether it is written in past tense.

After the values of the relevant features have been derived, at 424 those derived values and the specificity labels assigned to the training text segments (i.e., the annotated specificity labels) are used to train the specificity model. The mathematical framework for a model for assessing specificity may be, for example:

$$\text{Specificity} = w_0^{SP} + w_1^{SP} \cdot F_1^{SP} + w_2^{SP} \cdot F_2^{SP} + w_3^{SP} \cdot F_3^{SP} \ldots \quad (6)$$

where "Specificity" is a dependent variable whose value may represent the specificity value of a text segment determined according to the specificity model, the variables $F_i^{SP}$ are independent variables that represent values of the features determined from analyzing the text segment, and the coefficients $w_i^{SP}$ represent weighting coefficients for the associated variables $F_i^{SP}$. More generally, this model can be a function of dependent variables and associated weights and is not limited to a linear model. In an example, this model can be trained with training texts by using each text segment's assigned specificity measure (e.g., assigned by a human) as the dependent variable, "Specificity," and using the derived values of the relevant features as $F_i^{SP}$. At 425, the weights $w_i^{SP}$ are determined (e.g., by using regression analysis). At 426, the determined $w_i^{SP}$ weights are used to calibrate the specificity model. The resulting specificity model may be incorporated into a higher level model, such as an assessment model, which will be described with respect to FIG. 4B.

A sentiment model for determining a text segment's sentiment is trained at 430-436. Labels 431 to 433 represent one example where an iterative process analyzes the training texts to derive values for linguistic features used in the sentiment model. The iterative process may begin by analyzing each training text 431. For each text segment therein, it is analyzed to determine whether its content type is labeled as "evaluation," which indicates that the text segment's content relates to an evaluation of the recommendee 432. Each evaluative text segment is then analyzed to derive values for the predictive linguistic features used in the sentiment model 433. For example, if the sentiment model includes a sentiment feature as one of its independent variables, a text segment would be analyzed to determine whether it includes any positive, negative, or neutral word.

After the values of the relevant features have been derived, at 434 those derived values and the sentiment labels assigned to the training text segments (i.e., the annotated sentiment labels) are used to train the sentiment model. In an example, the mathematical framework could employ a linear model, such as:

$$\text{Sentiment} = w_0^{SE} + w_1^{SE} \cdot F_1^{SE} + w_2^{SE} \cdot F_2^{SE} + w_3^{SE} \cdot F_3^{SE} \ldots \quad (7)$$

where "Sentiment" is a dependent variable whose value may represent the sentiment value (e.g., a sentiment score) of a text segment determined according to the sentiment model, the variables $F_i^{SE}$ are independent variables that represent values of the features determined from analyzing the text segment, and the coefficients $w_i^{SE}$ represent weighting coefficients for the associated variables $F_i^{SE}$. More generally, this model can be a function of dependent variables and associated weights and is not limited to a linear model. In an example, this model can be trained with training texts by using each text segment's assigned sentiment measure (e.g., assigned by a human) as the dependent variable, "Sentiment," and using the derived values of the relevant features as values for the variables $F_i^{SE}$. At 435, the weights ware determined (e.g., by using regression analysis). At 436, the determined $w_i^{SE}$ weights are used to calibrate the sentiment model. The resulting sentiment model may be incorporated into a higher level model. For example, the output of the higher level model may be an average of the specificity values derived from applying the aforementioned specificity model (e.g., equation [6]) to the text segments of a constructed text and an average of the sentiment values derived from applying the aforementioned sentiment model (e.g., equation [7]) to the text segments of a constructed text. In another example, the higher level model may add the average specificity value and the average sentiment value and output a single value assessment output.

A rating model for predicting a constructed text's rating is trained at 440-445. Labels 441 and 442 represent one embodiment where an iterative process analyzes the training texts to derive values for linguistic features used in the sentiment model. Since in the depicted embodiment a rating is associated with an entire constructed text/training text and not a text segment, step 442 (i.e., deriving values for features) is performed at the training text level and not at the text segment level. For example, if the sentiment model includes word n-gram features where the words "ideal" and "excel" are specifically sought after, the number of each of those words appearing in a training text (rather than just in a text segment) is counted.

After the values of the relevant features have been derived, at 443 those derived values and the rating assigned by each training text's writer/recommender are used to train the rating model. In an example, the mathematical framework for the model is described by:

$$\text{Rating} = w_0^R + w_1^R \cdot F_1^R + w_2^R \cdot F_2^R + w_3^R \cdot F_3^R \ldots, \quad (8)$$

where "Rating" is a dependent variable whose value may represent the rating of a constructed text according to the rating model, the variables $F_i^R$ are independent variables that represent values of the features determined from analyzing the constructed text, and the coefficients $w_i^R$ represent weighting coefficients for the associated variables $F_i^R$. In an example, this model is trained by using the recommender-provided rating of each training text as the dependent variable, "Rating," and using the derived values of the relevant features as $F_i^R$. At 444, the weights $w_i^R$ are determined (e.g., by using regression analysis). At 445, the determined $w_i^R$ weights are used to calibrate the rating model. The resulting rating model may be incorporated into a higher level model, such as an assessment model, which will be described with respect to FIG. 4B.

A content-type model for determining a text segment's content type is trained at 450-456. Labels 451 to 453 represent one example where an iterative process analyzes the training texts to derive values for linguistic features used in the content-type model. The iterative process may begin by analyzing each training text 451. Then for each text segment therein 452, the text segment is analyzed to derive values for the predictive linguistic features used in the content-type model. For example, if the sentiment model includes a unigram feature for the recommendee's name (e.g., "*FIRST_NAME*") as one of its independent variables, a text segment would be analyzed to determine whether it includes the recommendee's name.

After the values of the relevant features have been derived, at 454 those derived values and the assigned content type of each text segment (i.e., the annotated content type) are used to train the content-type model. In one example, the content-type model may be a log-linear model, where the log of the probability of the positive class (i.e., the content type being an evaluation of the subject) is a linear function of the weights and feature values. In another example, the mathematical framework for the model is described by:

$$\text{Content-Type} = w_0^C + w_1^C \cdot F_1^C + w_2^C \cdot F_2^C + w_3^C \cdot F_3^C \ldots, \quad (9)$$

where "Content-Type" is a dependent variable whose value may represent the content type of a text segment determined according to the content-type model, the variables $F_i^C$ are independent variables that represent values of the features determined from analyzing the text segment, and the coefficients $w_i^C$ represent weighting coefficients for the associated variables $F_i^C$. In an example, this model is trained by using the assigned content type of each training text segment as the dependent variable, "Content-Type," and using the derived values of the relevant features as $F_i^C$. At 455, the weights $w_i^C$ are determined (e.g., by using regression analysis). At 456, the determined $w_i^C$ weights are used to calibrate the content-type model. The resulting content-type model may be incorporated into a higher level model, such as an assessment model, which will be described with respect to FIG. 4B.

FIG. 4B illustrate a flow diagram for an exemplary process for training an assessment model for assessing constructed texts (e.g., recommendations). At 459, a set of training texts—which may be a different set of training texts from the one accessed at 400—is accessed. Each of the training texts including one or more text segments. At 460, each training text, which includes one or more text segments, is preprocessed in a similar manner described above with respect to step 411.

At 461, each training text is analyzed and, depending on the features included in the assessment model, one or more of the steps listed in 462 to 467 are performed. At 462, specificity values for each text segment of the training text is determined by applying a trained specificity model (such as the one trained at 420) to the text segments. In an example, a text-level specificity value for the training text is calculated by taking the average of the text segments' determined specificity values. At 463, sentiment values for each text segment of the training text is determined by applying a trained sentiment model (such as the one trained at 430) to the text segments. In an example, a text-level sentiment value for the training text is calculated by taking the average of the text segments' determined sentiment values. At 464, content type values for each text segment of the training text is determined by applying a trained content type model (such as the one trained at 450) to the text segments. In an example, a text-level content type value for the training text is calculated based on the proportion of text segments that are determined to be "evaluative" (i.e., text segments that evaluate the recommendee). At 465, hedge words (e.g., "sometimes," "generally") in the training text are identified and quantified by, e.g., calculating the proportion of text segments that contain hedge words. At 466, references to the subject (e.g., recommendee) in the training text are identified and quantified by, e.g., summing up the number of occurrences in the text. At 467, a rating for the training text is determined by applying the rating model (such as the one trained at 440) to the training text.

After the values of one or more text-level features (i.e., 462-467) have been derived from the training texts, the assessment model is trained at 468. In one example, the assessment model may be a log-linear model, where the log of the probability of the positive class (e.g., the outcome may be whether an applicant got accepted) is a linear function of the weights and feature values. In another example, the model may be other types of statistical model for regression or classification. In yet another example, the mathematical framework for the assessment model may be represented by:

$$\text{Outcome} = w_0^O + w_1^O \cdot F_1^O + w_2^O \cdot F_2^O + w_3^O \cdot F_3^O \ldots, \quad (10)$$

where "Outcome" is a dependent variable whose value may represent the outcome value of a constructed text determined according to the assessment model, the variables $F_i^O$ are independent variables that represent values of the features determined from analyzing the constructed text, and the coefficients $w_i^O$ represent weighting coefficients for the associated variables $F_i^O$. Depending on what the assessment model is designed to predict, outcome data associated with each training text is used as the dependent variable (i.e., "Outcome") in the training. For example, if the assessment model is designed to predict the likelihood of a graduate-school or job applicant being accepted, the outcome data associated with a recommendation (i.e., the training text) may be whether the recommendee got accepted. Similarly, the outcome data may be a measure of success (e.g., GPA, salary, etc.) or simply a score reflecting the quality of the training text. The independent variables (i.e., features $F_i^O$) used in the model may be any quantitative measures of the training texts, such as those determined at 462-467, as well as any relevant external measures of proficiency, such as a recommendee's GPA or GRE scores. At 469, the weights are determined (e.g., by using regression analysis). At 470, the determined $w_i^O$ weights are used to calibrate the assessment model.

In an example, the assessment model may further incorporate models trained for determining any of the assessment model's features. For example, if $F_1^O$ corresponds to a text-level sentiment value, then $F_1^O$ may be substituted with a function that computes the average of text-segment-level sentiment values, which are determined using a trained text-segment-level sentiment model (i.e., equation [7]). That is, if the function using the text-segment-level sentiment model is denoted by AVG (Sentiment($F_i^{SE}$)), then equation (10) can be rewritten as:

$$\text{Outcome} = w_0^O + w_1^O \cdot \text{AVG}(\text{Sentiment}(F_i^{SE})) + w_2^O \cdot F_2^O + w_3^O \cdot F_3^O \ldots \quad (11)$$

Equation (10)'s other independent variables (i.e., features $F_2^O$, $F_3^O$) may similarly be replaced by their respective trained models (e.g., equations 6, 8, and/or 9).

Figure 5:
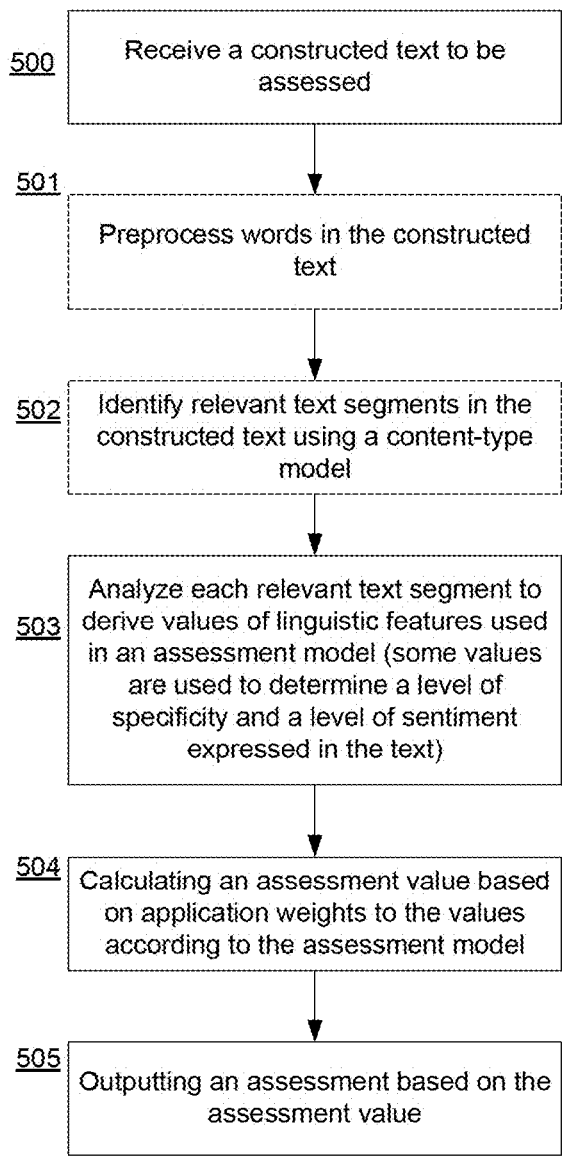
FIG. 5 is a flow diagram depicting an exemplary computer-implemented method of using an assessment model.

FIG. 5 is a flow diagram for an exemplary process for using a trained model to assess a constructed text. At 500, a constructed text to be assessed is received. At 501, the words in the constructed text are optionally preprocessed depending on whether the training texts used for training the model was preprocessed. At 502, a trained content-type model (e.g., equation [9]) may optionally be used to identify text segments with evaluative content. At 503, the constructed text's text segments (or evaluative text segments if step 502 was performed) are analyzed based on the linguistic features used in the model (i.e., the model's independent variables). For example, if the assessment model includes a sentiment model that has a positive-word feature, then the text segments are analyzed to identify the existence of positive words. If the assessment model includes a specificity model that has a past-tense feature, then the text segments are analyzed to determine which ones are written in past tense. The analysis of 503 results in the derivation of feature values. Then at 504, weights are applied to the derived feature values based on the assessment model to calculate an assessment value. At 505, an assessment based on the assessment value is outputted. The outputted assessment may simply be the assessment value, or the assessment may be some other form of information generated based on the calculated assessment value.

Figure 6A:
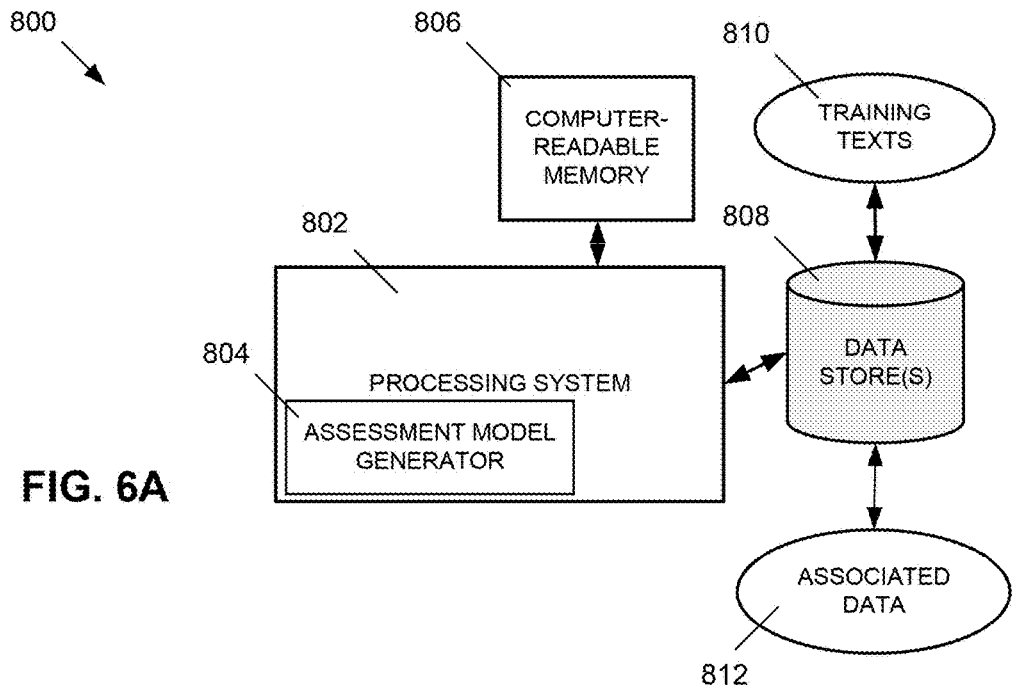
FIGS. 6A, 6B, and 6C depict exemplary systems for use in implementing a system for generating assessment models.
Figure 6B:
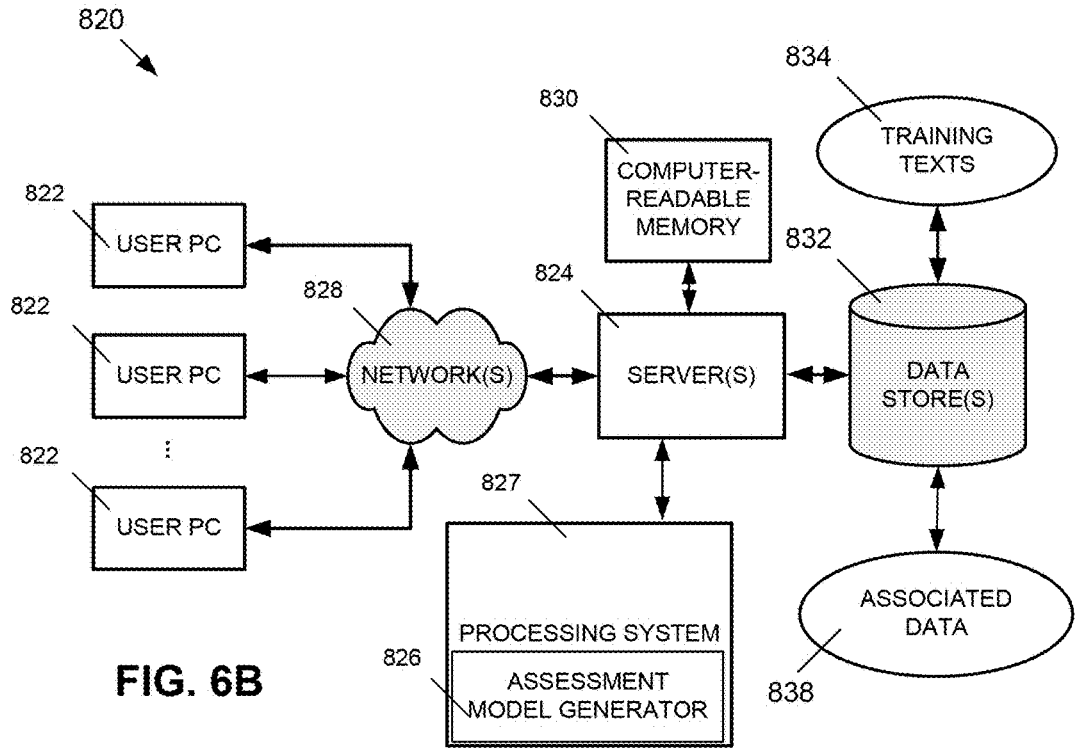
Figure 6C:
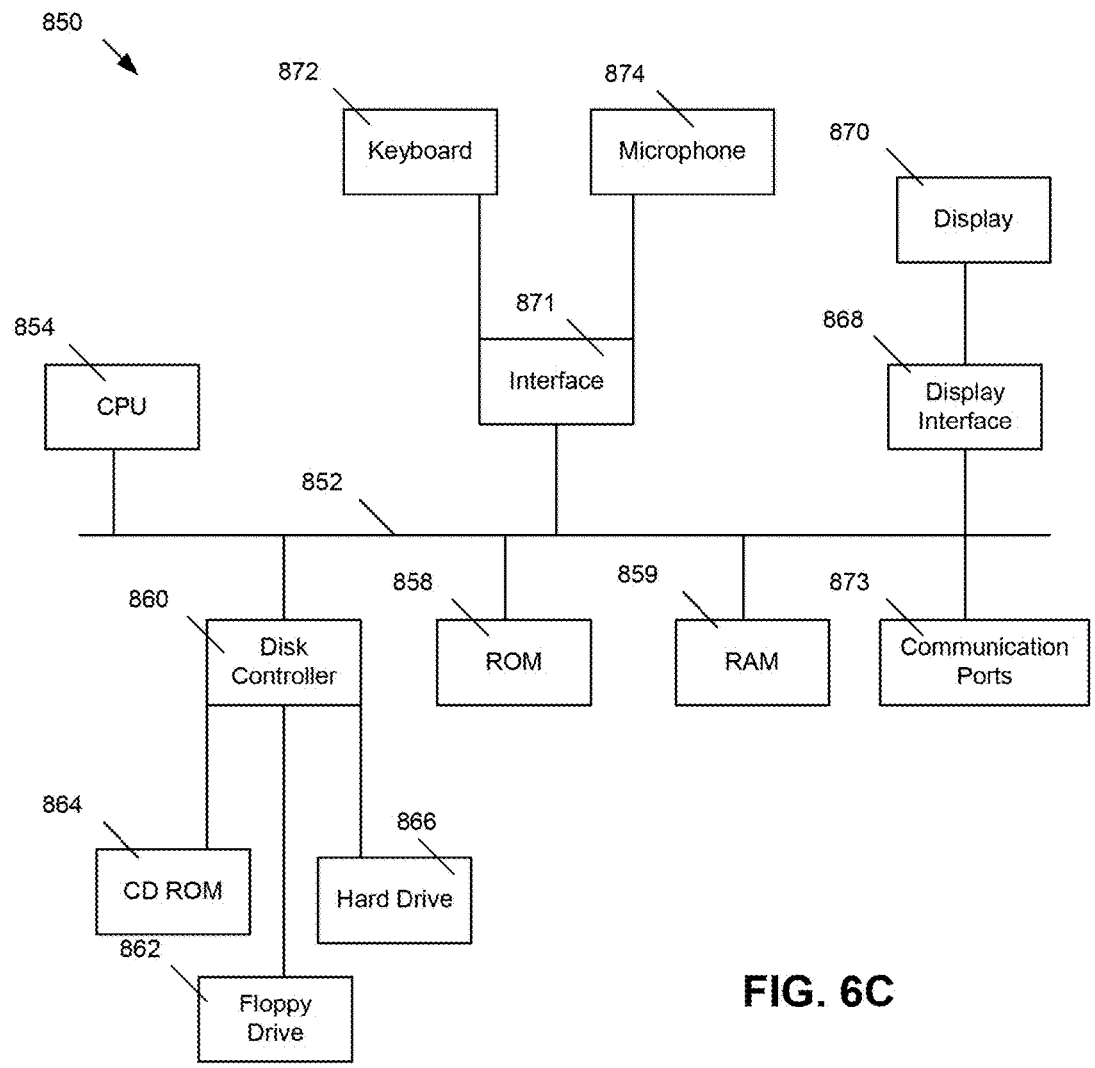

Additional examples will now be described with regard to additional exemplary aspects of implementation of the approaches described herein. FIGS. 6A, 6B, and 6C depict example systems for use in implementing an assessment model generator. For example, FIG. 6A depicts an exemplary system 800 that includes a standalone computer architecture where a processing system 802 (e.g., one or more computer processors located in a given computer or in multiple computers that may be separate and distinct from one another) includes an assessment model generator 804 being executed on it. The processing system 802 has access to a computer-readable memory 806 in addition to one or more data stores 808. The one or more data stores 808 may include training texts 810 as well as their associated data (e.g., outcome data, rating, annotations, etc.) 812.

FIG. 6B depicts a system 820 that includes a client server architecture. One or more user PCs 822 access one or more servers 824 running an assessment model generator 826 on a processing system 827 via one or more networks 828. The one or more servers 824 may access a computer readable memory 830 as well as one or more data stores 832. The one or more data stores 832 may contain training texts 834 as well as their associated data 838.

FIG. 6C shows a block diagram of exemplary hardware for a standalone computer architecture 850, such as the architecture depicted in FIG. 6A that may be used to contain and/or implement the program instructions of system embodiments of the present invention. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 858 and random access memory (RAM) 859, may be in communication with the processing system 854 and may contain one or more programming instructions for performing the method of implementing an assessment model generator. Optionally, program instructions may be stored on a non-transitory computer readable storage medium such as a magnetic disk, optical disk, recordable memory device, flash memory, or other physical storage medium.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 858 and/or the RAM 859. Preferably, the processor 854 may access each component as required.

A display interface 868 may permit information from the bus 852 to be displayed on a display 870 in audio, graphic, or alphanumeric format. Communication with external devices may optionally occur using various communication ports 873.

In addition to the standard computer-type components, the hardware may also include data input devices, such as a keyboard 872, or other input device 874, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, Python, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method of training an assessment model for assessing constructed texts expressing opinions on subjects of education or employment, comprising:
   receiving, using a processing system, a plurality of training texts, each of the training texts being a constructed text having one or more sentences, the one or more sentences expressing opinions on a subject of education or employment, wherein each sentence is annotated by a content type that defines whether the sentence is relevant to an evaluation on subjects of education or employment;
   iteratively analyzing the training texts, using the processing system after the receiving, to derive feature values of a plurality of linguistic features of the constructed text, the feature values numerically representing each of the plurality of linguistic features, and determine the plurality of linguistic features based on the content type being relevant to the evaluation on subjects of education or employment, wherein at least one of the plurality of linguistic features relates to sentiment and at least one of the plurality of linguistic features relates to specificity;
   training an assessment model, using the processing system after the iteratively analyzing, based on (i) the feature values of the plurality of linguistic features analyzed from the training texts, (ii) assigned measures of specificity of the opinions expressed in the training texts, and (iii) assigned measures of sentiment of the opinions expressed in the training texts;
   determining, using the processing system after the training, a weight for each of the plurality of linguistic features based on the training and based on regression analysis of the feature values of plurality of linguistic features;
   calibrating, using the processing system after the determining, the assessment model to include a combination of the feature values and the weights for at least some of the plurality of linguistic features such that the assessment model is configured to generate assessment measures for constructed texts expressing opinions on subjects of education or employment; and
   outputting, using the processing system after the calibrating, outcome data associated with each training text in the plurality of training texts or in a second plurality of training texts, wherein the outcome data measures a level of success experienced by the subject of the training text based on application of the weights to the feature values of the plurality of linguistic features.

2. The computer-implemented method of claim 1, wherein the assessment model comprises a specificity model and a sentiment model, wherein the specificity model is trained based on assigned measures of specificity for the training texts and at least some of the feature values of the plurality of linguistic features, wherein the sentiment model is trained based on assigned measures of sentiment for the training texts and at least some of the feature values of the plurality of linguistic features, wherein the specificity model and the sentiment model are trained separately.

3. The computer-implemented method of claim 1, wherein each training text is associated with an assigned rating, and wherein the training of the assessment model is further based on the assigned ratings.

4. The computer-implemented method of claim 3, wherein the assessment model comprises a rating model for determining ratings for constructed texts, and wherein the rating model is trained based on the assigned ratings and at least some of the feature values of the plurality of linguistic features.

5. The computer-implemented method of claim 1, wherein each training text includes one or more text segments, each of which is associated with an assigned content type, wherein the assessment model comprises a content-type model for determining content types of text segments of constructed texts, wherein the content-type model is trained based on the assigned content types of text segments of the training texts.

6. The computer-implemented method of claim 1, wherein each training text includes one or more text segments, wherein the training of the assessment model is further based on a proportion of the one or more text segments in each training text that are sufficiently related to the subject of the training text.

7. The computer-implemented method of claim 1, further comprising:
   predicting, using the processing system, correlations based on the level of success experienced by the subject of the training text;
   wherein the training of the assessment model is further based on the outcome data associated with each training text and the predicted correlations;
   wherein the assessment measures generated by the assessment model represent predictions of outcomes.

8. The computer-implemented method of claim 7, wherein the training of the assessment model is further based on one or more external measures of proficiency associated with each training text in the plurality of training texts or in a second plurality of training texts.

9. The computer-implemented method of claim 1, wherein training of the assessment model is further based on a quantity of instances where the training texts mention their respective subjects.

10. The computer-implemented method of claim 1, wherein training of the assessment model is further based on instances of hedge words appearing in the training texts.

11. A computer-implemented method of assessing constructed texts expressing opinions on subjects of education or employment, comprising:
- iteratively analyzing, using the processing system, a constructed text having one or more sentences, the one or more sentences expressing an opinion on a subject of education or employment, wherein each sentence is annotated by a content type that defines whether the sentence is relevant to an evaluation on subjects of education or employment to derive feature values of a plurality of linguistic features of the constructed text, the feature values numerically representing each of the plurality of linguistic features, and determine the plurality of linguistic features of the constructed text based on the content type being relevant to the evaluation on subjects of education or employment, wherein the plurality of linguistic features correspond to independent variables in an assessment model, wherein at least some of the feature values of the plurality of linguistic features are used to determine a level of specificity of the opinion expressed in the constructed text and a level of sentiment of the opinion expressed in the constructed text;
- calculating, using the processing system after the iteratively analyzing, an assessment value based on application of weights to the feature values of the plurality of linguistic features according to the assessment model, wherein the weights are determined based on regression analysis of the feature values of the plurality of linguistic features; and
- outputting, using the processing system after the calculating, an assessment of the constructed text based on the assessment value.

12. A non-transitory computer-readable medium for training an assessment model for assessing constructed texts expressing opinions on subjects of education or employment encoded with instructions for causing a processing system to execute steps comprising:
- receiving, using a processing system, a plurality of training texts, each of the training texts being a constructed text having one or more sentences, the one or more sentences expressing opinions on a subject of education or employment, wherein each sentence is annotated by a content type that defines whether the sentence is relevant to an evaluation on subjects of education or employment;
- iteratively analyzing the training texts, using the processing system, to derive feature values of a plurality of linguistic features, and determine the plurality of linguistic features of the constructed text of the training texts based on the content type being relevant to the evaluation on subjects of education or employment, the feature values numerically representing each of the plurality of linguistic features, wherein at least one of the plurality of linguistic features relates to sentiment and at least one of the plurality of linguistic features relates to specificity;
- training an assessment model, using the processing system after the iteratively analyzing, based on (i) the feature values of the plurality of linguistic features analyzed from the training texts, (ii) assigned measures of specificity of the opinions expressed in the training texts, and (iii) assigned measures of sentiment of the opinions expressed in the training texts;
- determining, using the processing system after the training, a weight for each of the plurality of linguistic features based on the training and based on regression analysis of the feature values of the plurality of linguistic features;
- calibrating, using the processing system after the determining, the assessment model to include a combination of the feature values and the weights for at least some of the plurality of linguistic features such that the assessment model is configured to generate assessment measures for constructed texts expressing opinions on subjects of education or employment; and
- outputting, using the processing system after the calibrating, outcome data associated with each training text in the plurality of training texts or in a second plurality of training texts, wherein the outcome data measures a level of success experienced by the subject of the training text based on application of the weights to the feature values of the plurality of linguistic features.

13. The non-transitory computer-readable medium of claim 12, wherein the assessment model comprises a specificity model and a sentiment model, wherein the specificity model is trained based on assigned measures of specificity for the training texts and at least some of the feature values of the plurality of linguistic features, wherein the sentiment model is trained based on assigned measures of sentiment for the training texts and at least some of the feature values of the plurality of linguistic features, wherein the specificity model and the sentiment model are trained separately.

14. The non-transitory computer-readable medium of claim 12, wherein each training text is associated with an assigned rating, and wherein the training of the assessment model is further based on the assigned ratings.

15. The non-transitory computer-readable medium of claim 14, wherein the assessment model comprises a rating model for determining ratings for constructed texts, and wherein the rating model is trained based on the assigned ratings and at least some of the feature values of the plurality of linguistic features.

16. The non-transitory computer-readable medium of claim 12, wherein each training text includes one or more text segments, each of which is associated with an assigned content type, wherein the assessment model comprises a content-type model for determining content types of text segments of constructed texts, wherein the content-type model is trained based on the assigned content types of text segments of the training texts.

17. The non-transitory computer-readable medium of claim 12, wherein each training text includes one or more text segments, wherein the training of the assessment model is further based on a proportion of the one or more text segments in each training text that are sufficiently related to the subject of the training text.

18. The non-transitory computer-readable medium of claim 12, further comprising instructions for causing the processing system to execute steps, including:
- predicting, using the processing system, correlations based on the level of success experienced by the subject of the training text;
- wherein the training of the assessment model is further based on the outcome data associated with each training text and the predicted correlations;
- wherein the assessment measures generated by the assessment model represent predictions of outcomes.

19. The non-transitory computer-readable medium of claim 18, wherein the training of the assessment model is further based on one or more external measures of proficiency associated with each training text in the plurality of training texts or in a second plurality of training texts.

20. The non-transitory computer-readable medium of claim 12, wherein training of the assessment model is further based on a quantity of instances where the training texts mention their respective subjects.

21. The non-transitory computer-readable medium of claim 12, wherein training of the assessment model is further based on instances of hedge words appearing in the training texts.

22. A non-transitory computer-readable medium for assessing constructed texts expressing opinions on subjects of education or employment encoded with instructions for causing a processing system to execute steps comprising:
   iteratively analyzing, using the processing system, a constructed text having one or more sentences, the one or more sentences expressing an opinion on a subject of education or employment, to derive feature values of a plurality of linguistic features of the constructed text, the feature values numerically representing each of the plurality of linguistic features, wherein each sentence is annotated by a content type that defines whether the sentence is relevant to an evaluation on subjects of education or employment, and determine the plurality of linguistic features of the constructed text based on the content type being relevant to the evaluation on subjects of education or employment, wherein the plurality of linguistic features correspond to independent variables in an assessment model, wherein at least some of the feature values of the plurality of linguistic features are used to determine a level of specificity of the opinion expressed in the constructed text and a level of sentiment of the opinion expressed in the constructed text;
   calculating, using the processing system after the iteratively analyzing, an assessment value based on application of weights to the feature values of the plurality of linguistic features according to the assessment model, wherein the weights are determined based on regression analysis of the feature values of the plurality of linguistic features; and
   outputting, using the processing system after the calculating, an assessment of the constructed text based on the assessment value.

23. A system for training an assessment model for assessing constructed texts expressing opinions on subjects of education or employment, comprising:
   a processing system; and
   a memory coupled to the processing system, wherein the processing system is configured to execute steps comprising:
      receiving, using the processing system, a plurality of training texts, each of the training texts being a constructed text having one or more sentences, the one or more sentences expressing opinions on a subject of education or employment, wherein each sentence is annotated by a content type that defines whether the sentence is relevant to an evaluation on subjects of education or employment;
      iteratively analyzing the training texts, using the processing system after the receiving, to derive feature values of a plurality of linguistic features of the constructed text, the feature values numerically representing each of the plurality of linguistic features, and determine the plurality of linguistic features based on the content type being relevant to the evaluation on subjects of education or employment, wherein at least one of the plurality of linguistic features relates to sentiment and at least one of the plurality of linguistic features relates to specificity;
      training an assessment model, using the processing system after the iteratively analyzing, based on (i) the feature values of the plurality of linguistic features analyzed from the training texts, (ii) assigned measures of specificity of the opinions expressed in the training texts, and (iii) assigned measures of sentiment of the opinions expressed in the training texts;
      determining, using the processing system after the training, a weight for each of the plurality of linguistic features based on the training and based on regression analysis of feature values of the plurality of linguistic features;
      calibrating, using the processing system after the determining, the assessment model to include a combination of the feature values and the weights for at least some of the plurality of linguistic features such that the assessment model is configured to generate assessment measures for constructed texts expressing opinions on subjects of education or employment; and
      outputting, using the processing system after the calibrating, outcome data associated with each training text in the plurality of training texts or in a second plurality of training texts, wherein the outcome data measures a level of success experienced by the subject of the training text based on application of the weights to the feature values of the plurality of linguistic features.

24. The system of claim 23, wherein the assessment model comprises a specificity model and a sentiment model, wherein the specificity model is trained based on assigned measures of specificity for the training texts and at least some of the feature values of the plurality of linguistic features, wherein the sentiment model is trained based on assigned measures of sentiment for the training texts and at least some of the feature values of the plurality of linguistic features, wherein the specificity model and the sentiment model are trained separately.

25. The system of claim 23, wherein each training text is associated with an assigned rating, and wherein the training of the assessment model is further based on the assigned ratings.

26. The system of claim 25, wherein the assessment model comprises a rating model for determining ratings for constructed texts, and wherein the rating model is trained based on the assigned ratings and at least some of the feature values of the plurality of linguistic features.

27. The system of claim 23, wherein each training text includes one or more text segments, each of which is associated with an assigned content type, wherein the assessment model comprises a content-type model for determining content types of text segments of constructed texts, wherein the content-type model is trained based on the assigned content types of text segments of the training texts.

28. The system of claim 23, wherein each training text includes one or more text segments, wherein the training of the assessment model is further based on a proportion of the one or more text segments in each training text that are sufficiently related to the subject of the training text.

29. The system of claim 23, wherein the processing system is further configured to execute steps, including:

predicting, using the processing system, correlations based on the level of success experienced by the subject of the training text;

wherein the training of the assessment model is further based on the outcome data associated with each training text and the predicted correlations;

wherein the assessment measures generated by the assessment model represent predictions of outcomes.

30. The system of claim 29, wherein the training of the assessment model is further based on one or more external measures of proficiency associated with each training text in the plurality of training texts or in a second plurality of training texts.

31. The system of claim 23, wherein training of the assessment model is further based on a quantity of instances where the training texts mention their respective subjects.

32. The system of claim 23, wherein training of the assessment model is further based on instances of hedge words appearing in the training texts.

33. A system for assessing constructed texts expressing opinions on subjects of education or employment, comprising:

a processing system; and a memory coupled to the processing system, wherein the processing system is configured to execute steps comprising iteratively analyzing, using the processing system, a constructed text having one or more sentences, the one or more sentences expressing an opinion on a subject of education or employment, to derive feature values of a plurality of linguistic features of the constructed text, the feature values numerically representing each of the plurality of linguistic features, wherein each sentence is annotated by a content type that defines whether the sentence is relevant to an evaluation on subjects of education or employment, and determine the plurality of linguistic features of the constructed text based on the content type being relevant to the evaluation on subjects of education or employment, wherein the plurality of linguistic features correspond to independent variables in an assessment model, wherein at least some of the feature values of the plurality of linguistic features are used to determine a level of specificity of the opinion expressed in the constructed text and a level of sentiment of the opinion expressed in the constructed text;

calculating, using the processing system after the iteratively analyzing, an assessment value based on application of weights to the feature values of the plurality of linguistic features according to the assessment model, wherein the weights are determined based on regression analysis of the feature values of the plurality of linguistic features; and outputting, using the processing system after the calculating, an assessment of the constructed text based on the assessment value.

* * * * *